March 18, 1947.    J. L. ALDRED, JR    2,417,581
AUTOMATICALLY COMPENSATING CABLE CONNECTION
Filed Dec. 31, 1942

Inventor
John L. Aldred Jr.
By Fred Gerlach
his Atty.

Patented Mar. 18, 1947

2,417,581

UNITED STATES PATENT OFFICE 2,417,581

AUTOMATICALLY COMPENSATING CABLE CONNECTION

John L. Aldred, Jr., Fort Worth, Tex., assignor, by mesne assignments, to Consolidated Vultee Aircraft Corporation, a corporation of Delaware Application December 31, 1942, Serial No. 470,885

1 Claim. (Cl. 267—1)

The invention relates to cable-connections used for controlling or shifting rudders, ailerons, elevators, flaps, and other devices. These connections usually extend between a control element within reach of the pilot and a remotely located control surface which is to be operated. These cable connections are adapted to perform their work by a pull on the cable and are usually of considerable length because they extend between the pilot's cabin and the controlled device which is remotely located from the cabin.

Airplanes operated in a wide range of altitudes are subjected to extremes of atmospheric temperature. For example, an airplane at ground level where the atmospheric temperature is approximately 100° F. may ascend for travel to an altitude of 30,000 feet where the temperature will normally be approximately —48° F. These changes in temperature cause expansion and contraction of the aircraft structure on which the elements and cable-connections are mounted, particularly in large airplanes constructed of aluminum alloy. Cables used for operating the control surfaces are made of steel which does not have the same coefficient of expansion as the aluminum alloy used in the structure on which the cable and elements connected thereby are mounted. In some instances the cables extend through heated areas inside of the aircraft body and are exposed to the outside air for only a portion of their length, whereas the outer surface of the airplane body is exposed for its entire length. These cable-connections are normally stressed to a predetermined tension when the airplane is located where the temperature is moderate. If the cable is under predetermined or correct tension while the aircraft is on the ground or where the outside temperature is moderate and the airplane travels to high altitudes, the contraction of the airplane structure resulting from the low temperature will produce slack in the cable. Such slack will render the operation of the controlled elements inaccurate or unsatisfactory or may render them inoperative. A desideratum in aircraft is to maintain the cable connections under a predetermined tension at all times.

The primary object of the present invention is to provide a tension regulating device for automatically maintaining the flight control cables of an airplane at a substantially uniform and predetermined tension so that the controls will remain effective and satisfactory notwithstanding extreme variations in the atmospheric temperature which cause contraction of the airplane structure.

Another object of the invention is to provide a simple and efficient device which forms a link in a cable-connection for shifting or controlling elements on aircraft and by which the desired predetermined tension will be maintained for correct operation at the extreme atmospheric temperatures in which the airplane is operated.

Other objects of the invention will appear from the detailed description.

The invention consists in the several novel features which are hereinafter set forth and more particularly defined by claim at the conclusion hereof.

Figure 1:
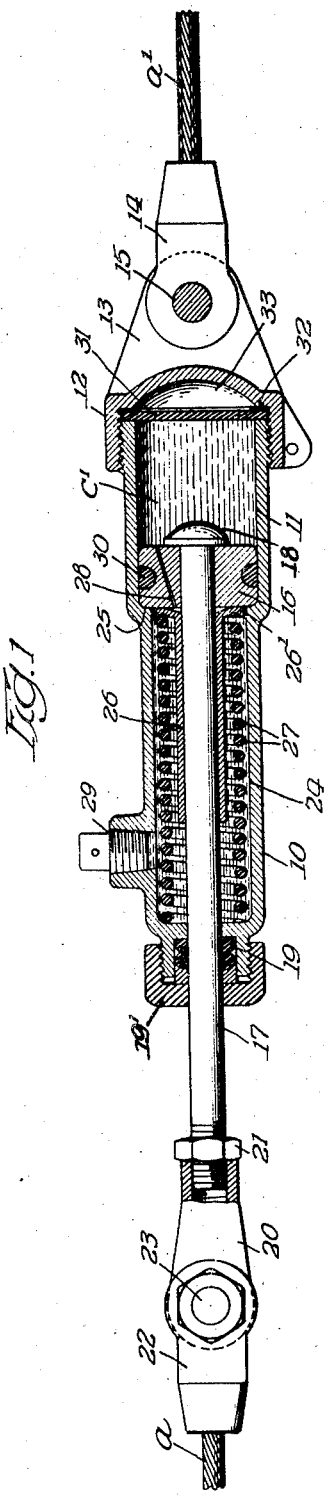
Fig. 1 is a longitudinal section of a cable connection embodying the invention.

The invention is exemplified in connection with a cable comprising sections $a$ and $a^1$, and an automatic tensioning device between and connecting said cable-sections. One of the cable-sections may be connected to a shifting element such as a lever or other device whereby a pull may be exerted on the cable, and the other is connected to an element which is controlled or operable by a pull exerted upon the other cable-section. The cable-sections and the connecting-device form a connection which is designed to be normally maintained under sufficient tension to avoid slack which must be taken up when the connection is pulled in one direction by the control element in the cab. The connecting device between the cable-sections automatically regulates the tension to maintain the cable taut.

This automatic device comprises a casing 10 which is provided adjacent one of its ends with a cylinder 11. The casing 10 at said end has screw threaded thereto a head 12 which has an eye 13 integrally formed therewith. Cable section $a^1$ has one of its ends provided with a suitable fitting or yoke 14 which is coupled to the eye 13 by a pin or bolt 15. A piston 16 is slidably mounted in the cylinder 11 and has a peripheral packing ring 30 for preventing the hydraulic fluid from leaking around the piston. A piston-stem 17 is provided with a head 18 which abuts against the outer face of piston 16. Stem 17 extends, and is slidable, through one end of the casing 10 and a packing 19 is held by a cap and gland 19' in said end of the casing 10. The outer end of said stem is screw-threaded and adjustably secured to an eye 20 which is locked in its adjusted position on the stem by a nut 21. One end of the cable-section a has fixedly secured thereto a fitting or coupling 22 which is connected by a pin or bolt 23 to the eye 20 on the piston-stem 17. A cylinder 24 is formed in casing 10 and extends from a shoulder 25 at the inner end of cylinder 11, which limits the movement of the piston 16 in one direction, to the end of the casing 10 which carries the packing 19. A sleeve 26 extends around the piston-stem 17 and has a flange 26' on its inner end which abuts against the inner face of piston 16. A coil-spring 27 engages the end wall at the outer end of cylinder 24 and presses the sleeve into abutting engagement with one face of piston 16. The inner end of spring 27 is supported by the flange 26' of sleeve 26 to prevent it from sagging. Spring 27 has a predetermined force which exerts pressure against sleeve 26 and through said sleeve against one face of piston 16. Cylinders 24 and 11 are filled with suitable hydraulic fluid c. A filling-plug 29 is provided for loading said cylinders with said liquid. A small orifice 28 extends longitudinally through the piston 16 and permits the liquid to flow through the piston between cylinders 11 and 24. Orifice 28 terminates at a channel in the inner end of sleeve 26 and the latter is sufficiently loose or has enough clearance around stem 17 to permit the liquid to pass back and forth between orifice 28 and cylinder 24. A flexible diaphragm 31 closes the outer end of cylinder 11 and has its margin clamped between a shoulder 32 in head 12 and the end of casing 10 at the outer end of cylinder 11. Head 12 is provided at the outer side of diaphragm 31 with a domed cavity 33. Said diaphragm and cavity form a closed air chamber. The diaphragm 31 and air chamber 33 provide a space to compensate for the reduced space for the liquid in cylinders 24 and 11 which is caused by the inward movement of the stem 17 when the piston 16 is shifted to take up slack in the cable and also serve to compensate for the volumetric changes of the fluid due to changes in its temperature.

In the use of the device shown in Fig. 1 the entire space in the cylinders 24 and 11 around stem 17 and piston 16 is filled with a suitable hydraulic fluid, usually a non-freezing liquid. The piston-stem 17 is coupled to the cable-section $a$ by means of eye 20 and pin 23 and the casing 10 is coupled to the cable-section $a^1$ by means of head 12 and pin 15. The cable between the control and controlled elements to which the ends of the cable-sections are connected will then be adjusted in suitable manner, which may include the adjustment of the screw-connection between eye 20 and stem 17, to keep the cable-sections taut and under predetermined tension. The resistance value of the spring 27 selected is such that when the cable is under the desired tension for operation it will be under predetermined compression when piston 16 is seated on the shoulder 25 in casing 10. This adjustment must be made when the airplane is at ground level where high temperatures usually prevail. When the airplane travels to higher altitudes where substantially lower temperatures exist, the aircraft body will contract and shorten the distance between the elements to which the outer ends of the cable are connected. Unless compensated for, this contraction will slacken or undesirably reduce the tension on the cable. This contraction occurs at a slow rate. As it occurs, spring 27 will force the piston 16 to move outwardly in cylinder 11. The orifice 28 will slowly permit the liquid in cylinder 11 to flow through the piston, sleeve 26, and into cylinder 24 and permit the piston 16 to move outwardly until the slack in the cable caused by the contraction of the aircraft body is taken up and the connection is again under the desired tension for its desired operation. As the piston 16 is thus shifted, the stem 17 will reduce the liquid-space in the casing 10. To compensate for this reduction in area and any volumetric variation of the liquid caused by changes in its temperature, the diaphragm 31 will flex into the cavity 33 and increase the area of the space in cylinder 11. This operation will automatically maintain the desired predetermined tension on the cable. When the airplane again travels to lower regions of higher atmospheric temperature, the aircraft body will expand and increase the distance between the elements on the airplane which are connected by the cable. This increase produces a pull upon the cable-sections which will force the piston toward shoulder 25 so that liquid will be slowly forced from the left hand side of piston 16 against the load of spring 27 to the right hand side of the piston, to automatically compensate for said expansion. As a result, the desired predetermined tension on the cable-connection will be automatically regulated or maintained to compensate for the expansion and contraction of the aircraft body. As the piston-stem 17 is moved out of the casing, the diaphragm will flex to its normal position. The automatic device may be located at any desired point in the connection.

The connections in practice are usually subjected to sudden pull for operating the control element during the maneuvering of the airplane. This pull will be solidly resisted after the piston with the orifice therein has been shifted away from its normal position by the entrapped fluid between one side of the piston and one end of the casing, because the orifice is so small that the leakage of fluid therethrough will be negligible during the pull on the cable. The invention contemplates a slow or restricted flow of hydraulic fluid through the piston. If desired, a very slight clearance between the piston and the cylinder wall may be provided in lieu of an orifice extending through the piston.

Figure 2:
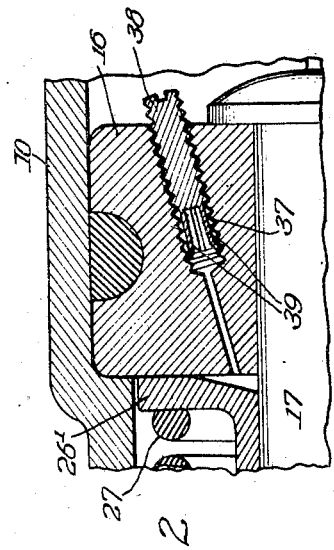
Fig. 2 is a detail section of a modified form of device for controlling the passage of the hydraulic fluid through the piston.

Fig. 2 illustrates a modification in which provision is made for varying the rate of flow of hydraulic fluid through the orifice in the piston. The orifice is provided with a screw-thread 37 for a screw 38 which has a slight clearance in said screw-thread. The inner end of the screw is provided with resilient fingers 39 for holding the screw in its set position in the piston. By turning the screw into or out of the screw-thread in the piston the rate of flow through the orifice may be varied to permit transfer of the fluid through the piston at the optimum or desired rate.

The invention exemplifies a cable-connection adapted particularly for use in connection with aircraft whereby the desired tension on the cable for the control devices will be automatically maintained or regulated and for preventing any slack in the cable which impairs or renders unsatisfactory or inoperative the connection in its control of elements by a pull.

The cable exemplifies a flexible pulling element, and that term is to be understood to include equivalent flexible elements such, for example, as a wire.

The invention is not to be understood as restricted to the details set forth since these may be modified within the scope of the appended claim without departing from the spirit and scope of the invention.

Having thus described the invention, what I claim as new and desire to secure by Letters Patent is:

An automatic tensioning device in a controlling or shifting connection between elements supported by a structure which is responsive to contraction and expansion from temperature variations, comprising a casing provided with a cylinder and connected to one of the elements, a piston movable in said cylinder, a stem for the piston extending through one end of the casing and connected to the other of the elements, the casing being provided with a chamber of lesser diameter than the cylinder into which the stem extends, and with a shoulder between the chamber and the cylinder, the chamber and cylinder being filled with a fixed and predetermined volume of hydraulic fluid and disposed on both sides of the piston, a spring in the casing for shifting the piston to hold the element under predetermined tension, means for restrictively conducting the fluid from one side of the piston to the other for controlling the movement of the piston by the spring and automatically compensating for the contraction of the structure to maintain the element under tension and means responsive to volumetric changes in the fixed volume of the fluid resulting from thermal expansion and contraction of the fluid for varying the cubical area of the chamber to compensate for said expansion and contraction and maintaining the elements under said tension.

JOHN L. ALDRED, JR.

REFERENCES CITED

The following references are of record in the file of this patent:

UNITED STATES PATENTS

| Number | Name | Date |
|---|---|---|
| 2,178,066 | Clark | Oct. 31, 1939 |
| 564,351 | Vaughan | July 21, 1896 |
| 1,928,816 | Grayson | May 15, 1934 |
| 1,825,823 | Ryder | Oct. 6, 1931 |
| 1,761,747 | Rosin et al. | June 3, 1930 |
| 682,536 | Duncanson | Sept. 10, 1901 |
| 381,731 | Walker | Apr. 24, 1888 |
| 2,323,352 | Pitts | July 6, 1943 |

FOREIGN PATENTS

| Number | Country | Date |
|---|---|---|
| 1667/31 | Australia | May 17, 1932 |
| 700,009 | France | Dec. 17, 1930 |